T. G. PLANT.
LAYING AND LEVELING MACHINE.
APPLICATION FILED MAY 24, 1909.

958,283.

Patented May 17, 1910.
9 SHEETS—SHEET 1.

Witnesses:
Roswell F. Hatch
Redfield H. Allen

Inventor
Thomas G. Plant
by Robt. P. Hairs
Atty.

T. G. PLANT.
LAYING AND LEVELING MACHINE.
APPLICATION FILED MAY 24, 1909.
Patented May 17, 1910.
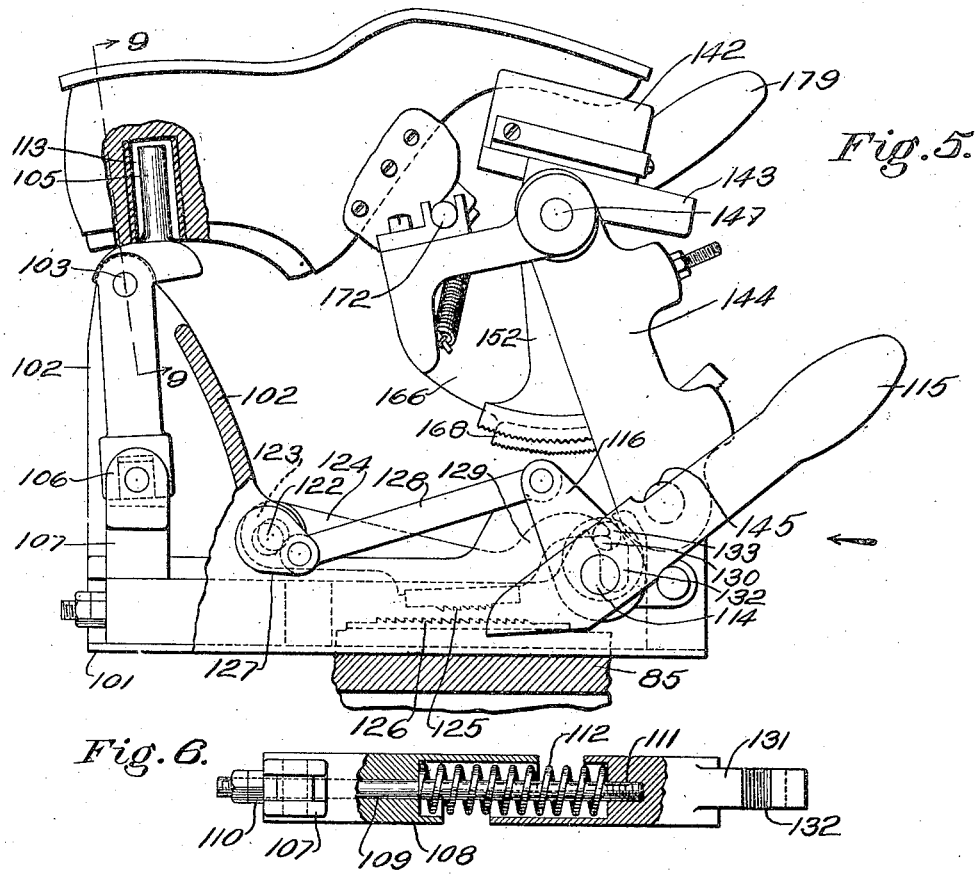
Fig. 5.
Fig. 6.
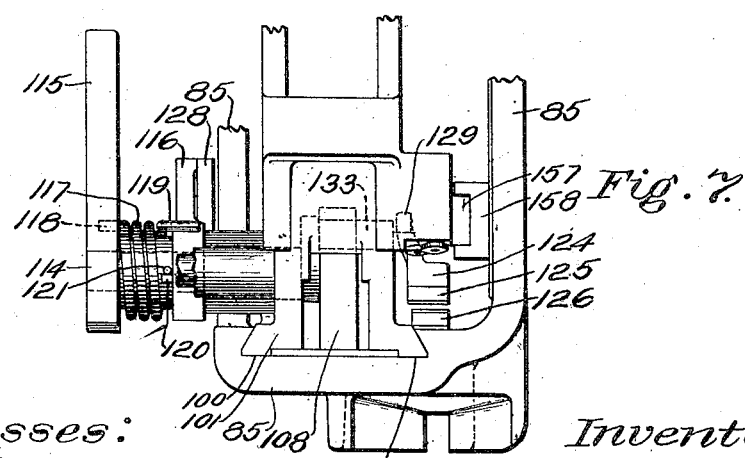
Fig. 7.
Witnesses:
Inventor:
Thomas G. Plant
Atty.

T. G. PLANT.
LAYING AND LEVELING MACHINE.
APPLICATION FILED MAY 24, 1909.
958,283.
Patented May 17, 1910.
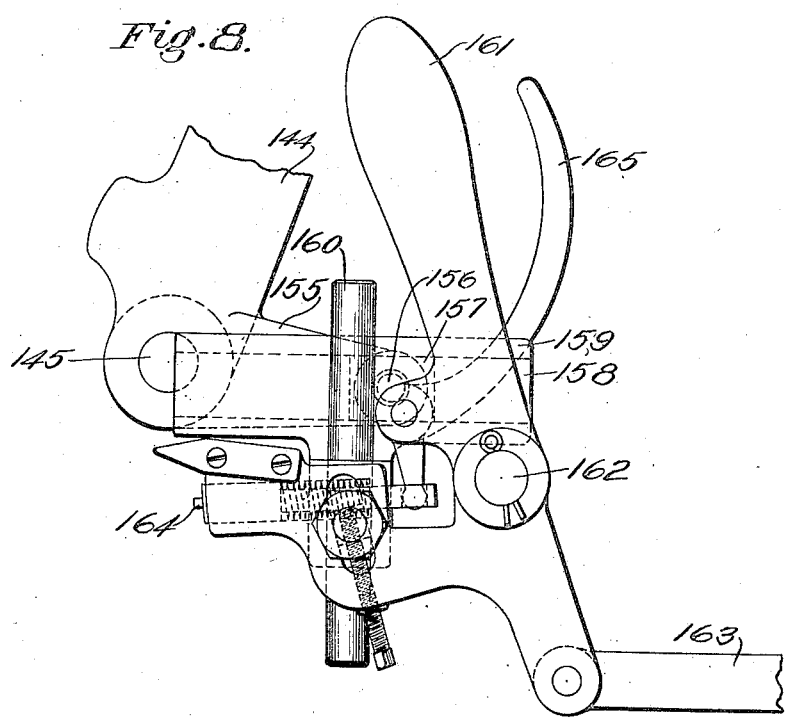
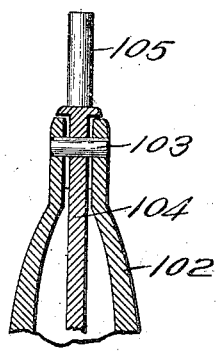

T. G. PLANT.
LAYING AND LEVELING MACHINE.
APPLICATION FILED MAY 24, 1909.
958,283.
Patented May 17, 1910.
9 SHEETS—SHEET 8.
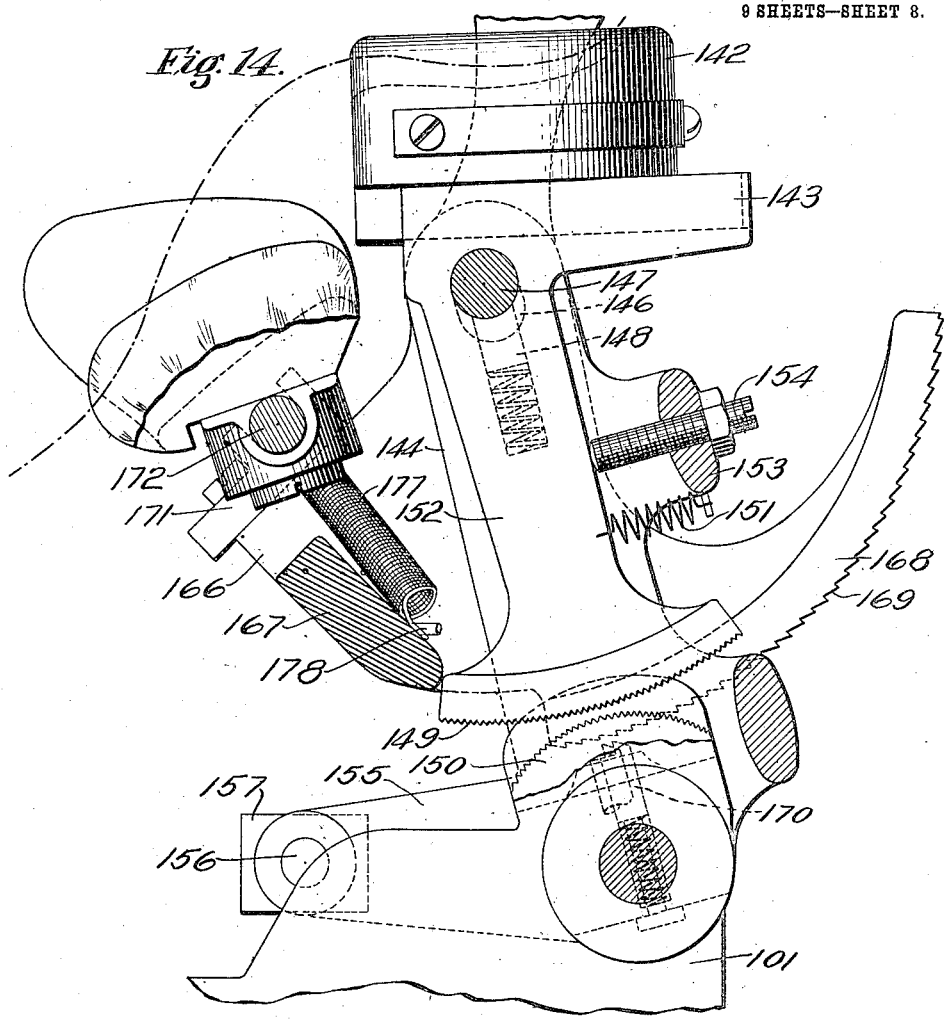
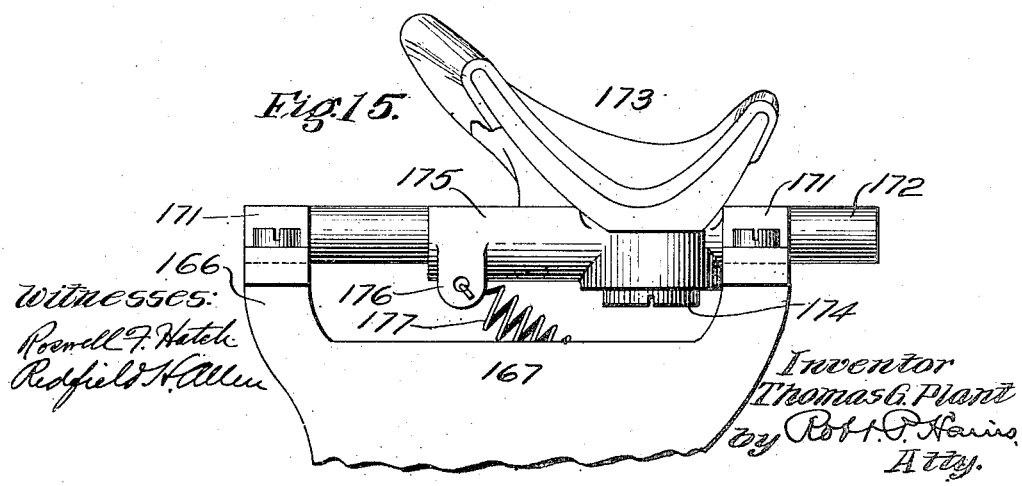
Witnesses:
Powell F. Hatch
Redfield H. Allen
Inventor
Thomas G. Plant
by Robt. F. Harris
Atty.

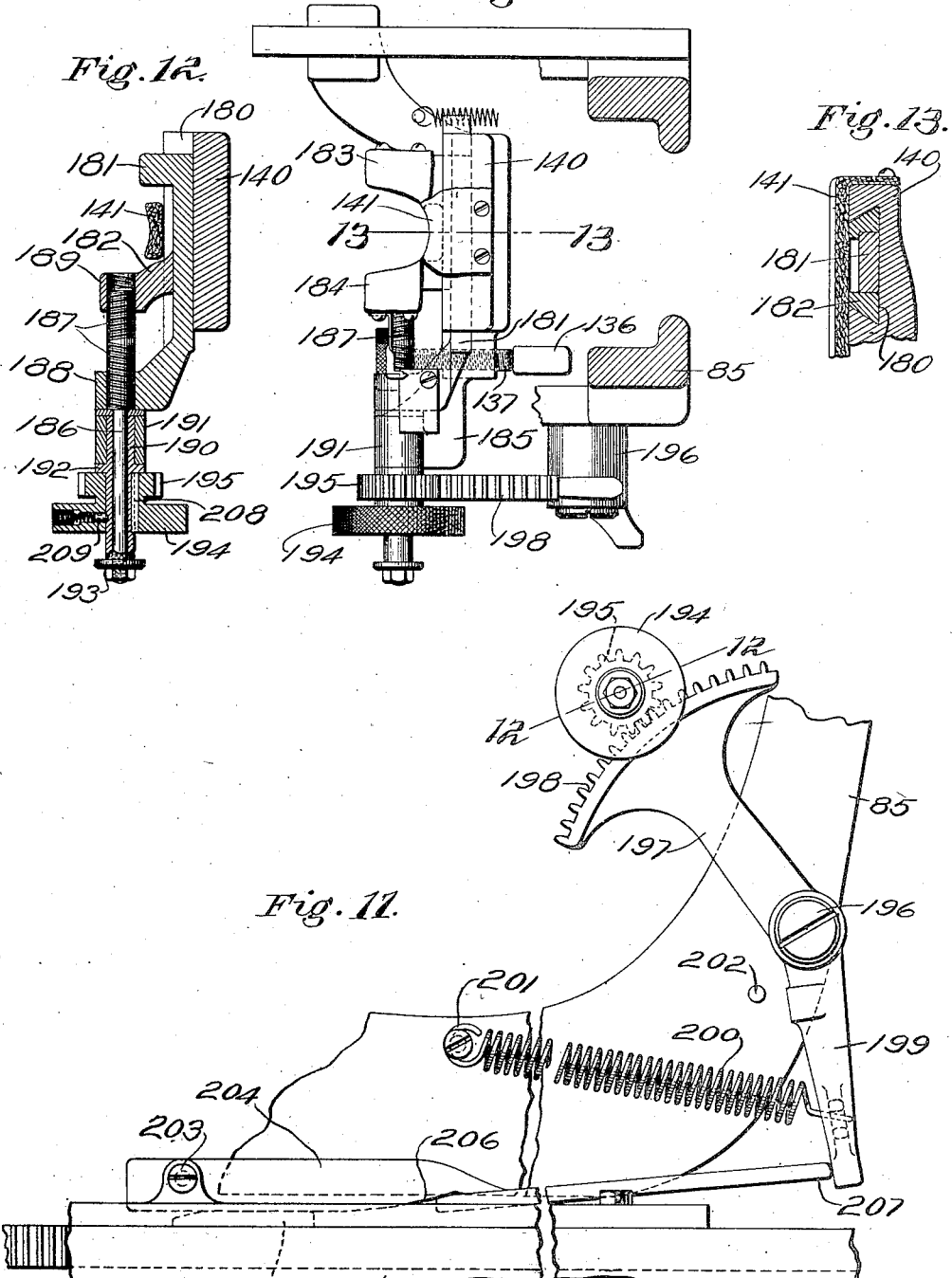

UNITED STATES PATENT OFFICE.

THOMAS G. PLANT, OF BOSTON, MASSACHUSETTS.

LAYING AND LEVELING MACHINE.

958,283.  Specification of Letters Patent. Patented May 17, 1910.

Application filed May 24, 1909. Serial No. 497,959.

*To all whom it may concern:*

Be it known that I, THOMAS G. PLANT, a citizen of the United States, residing at Boston, in the county of Suffolk and State of Massachusetts, have invented an Improvement in Laying and Leveling Machines, of which the following description, in connection with the accompanying drawings, is a specification, like numerals on the drawings representing like parts.

The invention to be hereinafter described relates to sole laying and leveling machines and more particularly to the boot or shoe support and its actuating means.

The aims and objects of the present invention are to provide a boot or shoe support and actuating means of improved construction, more especially with reference to the purposes of a sole laying or leveling machine, although, as will be evident, features of the present invention are adapted for use in other relations.

The objects sought by the present invention will best be understood by reference to the following description and accompanying drawings of one form of means for carrying the invention into practical effect, it being understood that the invention in its true scope is not restricted to the details herein, but is definitely set forth by the claims.

Figure 1:
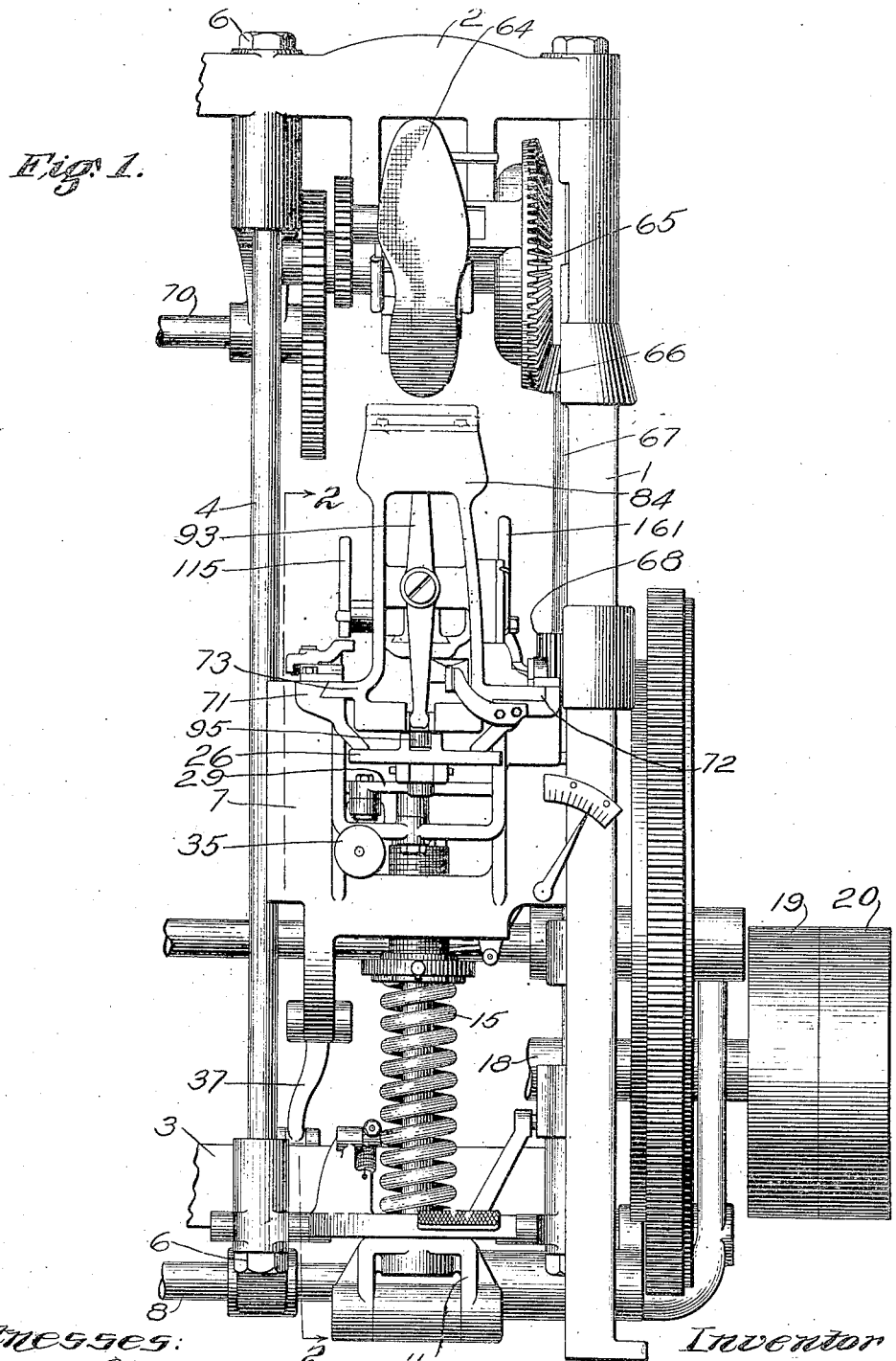
Figure 2:
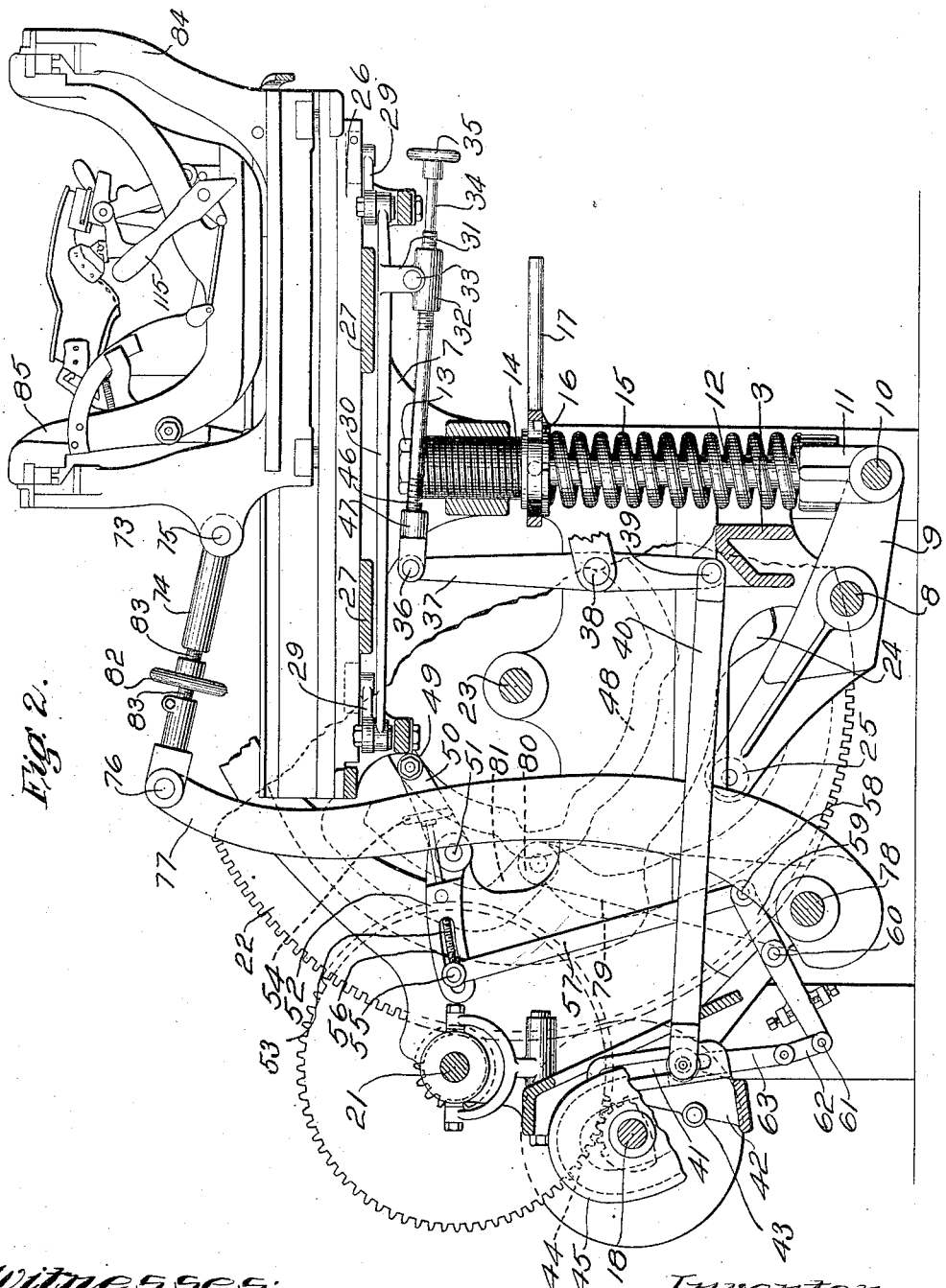
Figure 3:
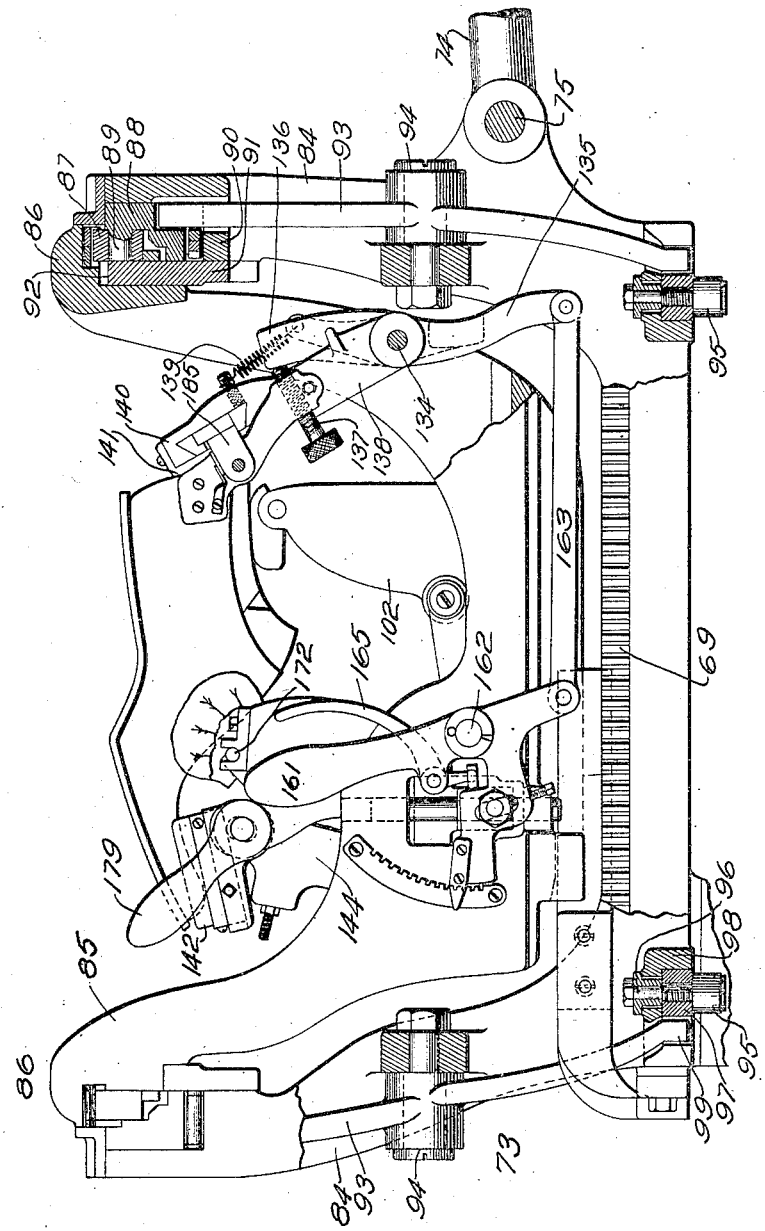
Figure 4:
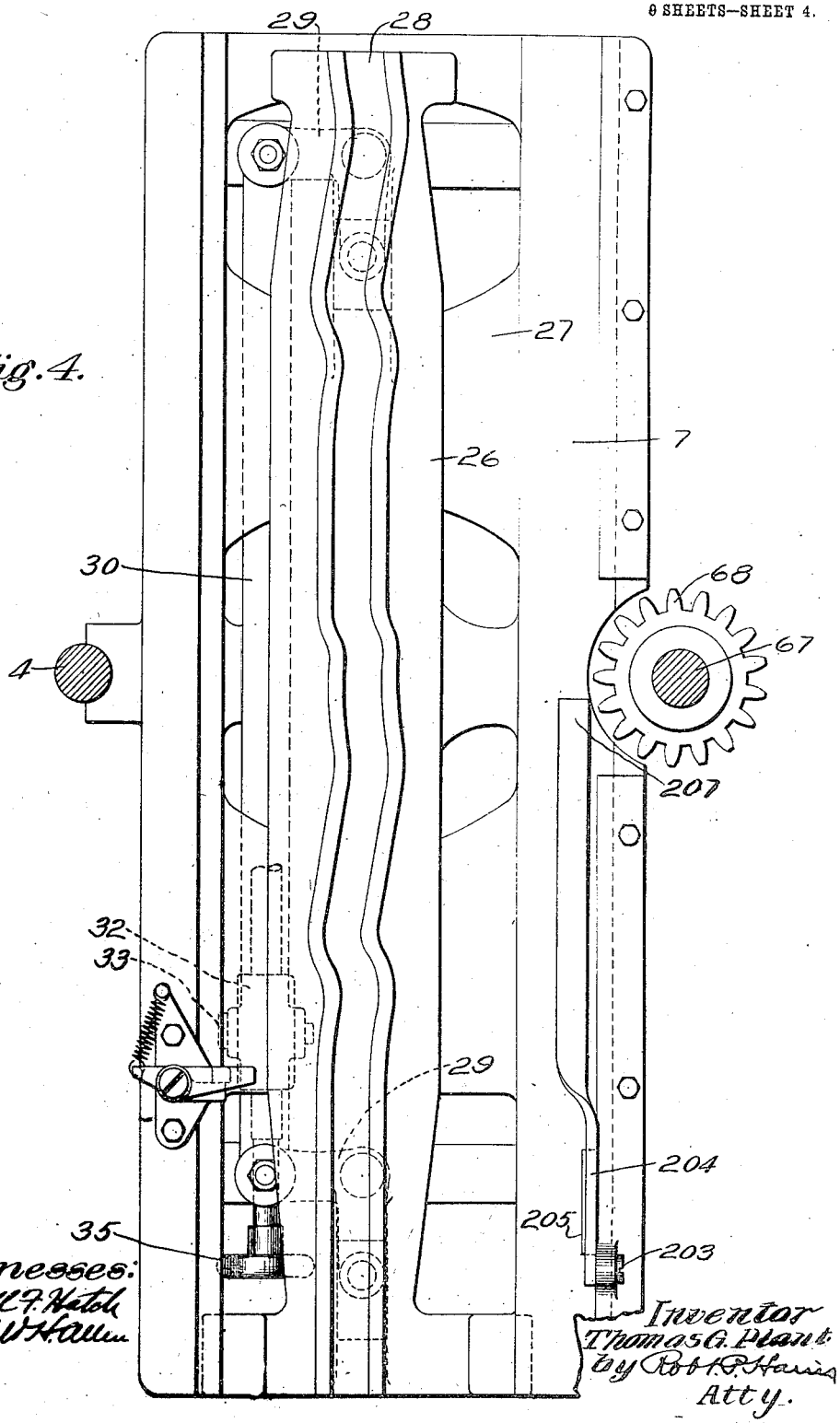
Figure 16:
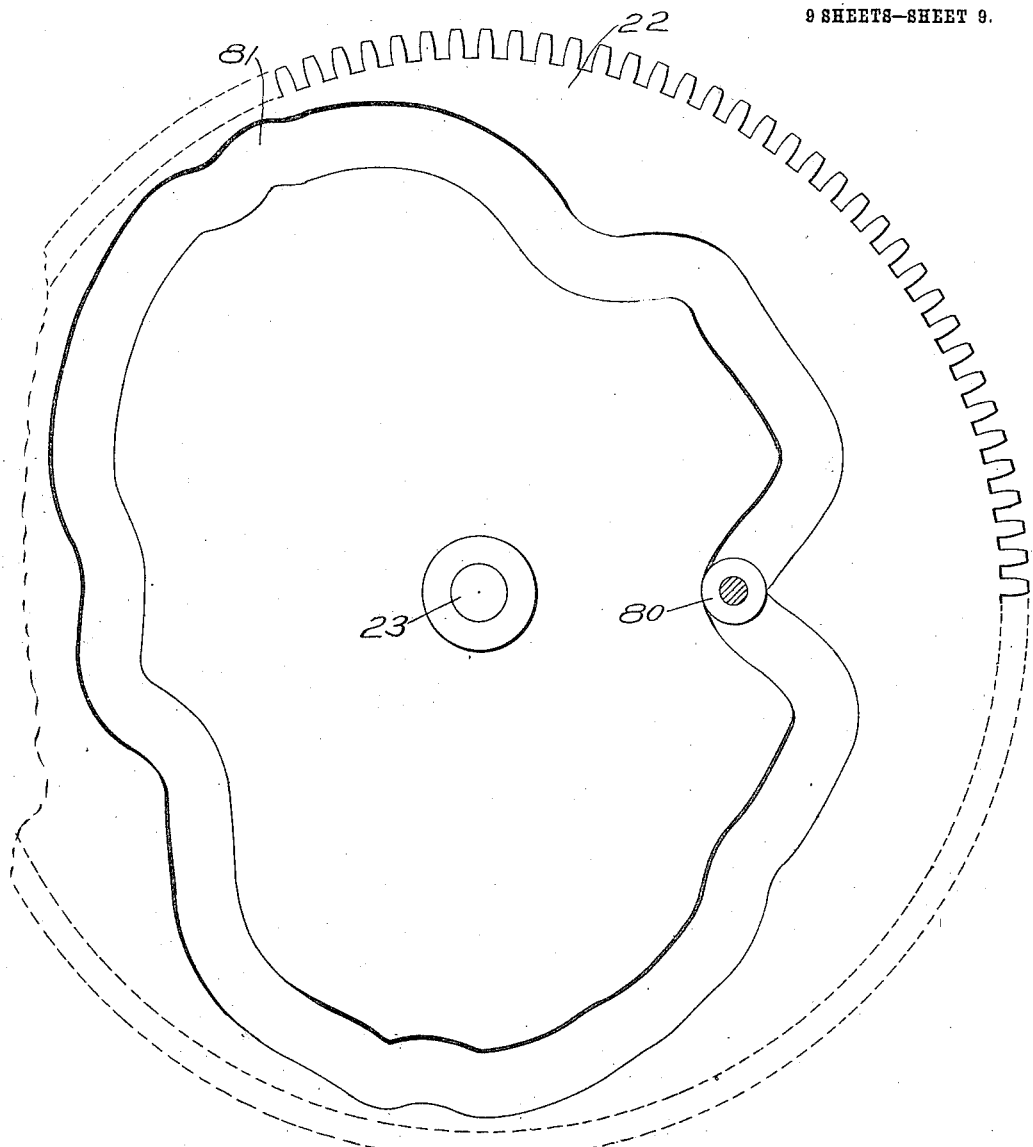

In the drawings: Figure 1 is a front view of a sole laying or leveling machine embodying the present invention, said machine in its entirety being preferably formed in duplicate or as a twin machine, only one of which is shown; Fig. 2 is an enlarged section on the line 2—2, Fig. 1; Fig. 3 is a detached detail side view of the shoe support, parts being broken away to disclose structures beyond; Fig. 4 is a detached and enlarged plan view of the shifting cam, parts being shown in section; Fig. 5 is a detail view of that part of the shoe support directly sustaining the shoe, some of the parts being broken away; Fig. 6 is a detail of the jacking slide rod for actuating the last-pin; Fig. 7 is a front view of the lower portion of the parts shown by Fig. 5, looking in the direction of the arrow, Fig. 5; Fig. 8 shows in side view the details of the size adjusting means; Fig. 9 is a detail sectional view of the loose last-pin on the line 9—9, Fig. 5; Fig. 10 is a top view with parts shown in section of the heel stop and counter clamps and actuating means therefor; Fig. 11 is a side view in detail, showing the means for automatically actuating the counter clamps, some of the parts being omitted; Fig. 12 is a section on the line 12—12, Fig. 11, showing also the counter clamp slides or carriers; Fig. 13 is a section on the line 13—13, Fig. 10; Fig. 14 is an enlarged detail showing the toe and instep support, some of the parts being in section; Fig. 15 is a detached detail view showing the instep support; and Fig. 16 is an enlarged view of the cam for automatically actuating the shoe support or jack during the operation of the machine.

Referring to Figs. 1 and 2 of the accompanying drawings, the machine frame may be of any suitable or desired character for sustaining the operating parts, and, as illustrated, comprises uprights 1 connected at top and bottom by suitable cross ties 2 and 3, substantially as described in my prior application Ser. No. 454,082, filed September 21, 1908. Extending between the cross ties 2 and 3, or from the top to the bottom of the machine frame, are the tie rods 4 suitably connected to the machine frame at top and bottom by nuts 6 screw-threaded thereto. As in my prior application the machine frame may be formed in duplicate so as to afford suitable sustaining means for duplicate mechanism or, as commonly understood, a twin machine; and the tie rods 4 may, as in said application, constitute guiding means for a table 7 which is adapted to slide vertically on said rods, said table affording a suitable support for the shoe supporting means or jack, to be hereinafter described.

Mounted on a fulcrum 8, Fig. 2, is a lever 9 connected at 10 to a yoke 11 from which rises a rod 12 having a nut 13 on its upper end above the screw-threaded adjusting device 14 through which it passes, a spring 15 being interposed between the yoke 11 and a collar 16 connected to the adjusting device 14 and adapted to be rotated by means of a handle 17 or other suitable means, all substantially as in my prior application referred to, the construction being such that upon actuation of the lever 9 by any suitable means the table 7 to which the adjusting device 14 is connected, as in said application, will be suitably raised and lowered, as will be clearly understood.

Mounted in suitable bearings in the machine frame 1 is the main driving shaft 18 having a fast and loose pulley 19 and 20 thereon, Fig. 1, said driving shaft being suitably connected to the clutch shaft 21 provided with clutching and unclutching devices, substantially as in my said prior application, and said devices being therein fully described need no further description here. Operatively connected to the clutch shaft 21, as in my said prior application, is a cam faced gear 22 mounted on the cam shaft 23 and which, when the clutching devices are manipulated to cause the machine to operate, will be rotated at suitable speed, as pointed out in said application, to effect the desired operations to be hereinafter described. The cam faced gear 22 carries on one face thereof a suitable cam 24 for acting upon a roll 25, Fig. 2, on the lever 9 whereby, as said cam faced gear 22 is rotated, the lever 9 will be raised and lowered in response to the cam 24. Suitably mounted to slide laterally on the table 7 is a cam plate 26, Figs. 1, 2 and 4, said cam plate being sustained on said table by means of suitable sustaining webs 27, Figs. 2 and 4, and, aside from the peculiar formation of its cam path 28, Fig. 4, said cam plate 26 may be substantially as set forth in my prior application hereinbefore mentioned. As in my before mentioned application, the cam plate 26 is designed to be given a lateral or transverse vibratory movement, and to this end there is mounted on the table 7 the bell crank levers 29, as in said prior application, said bell crank levers being suitably connected, as indicated in Fig. 4, to the under portion of the cam plate 26, and the free arms of said levers being joined together by a connecting or tie rod 30, Figs. 2 and 4, the construction being such that upon movement of the rod 30 the bell crank levers will be vibrated to give transverse or lateral movement to the cam plate, in a manner substantially as pointed out in my prior application.

Extending from the rod 30, Fig. 2, is a lug 31 carrying a threaded sleeve 32 pivotally connected thereto at 33 and engaged by a screw-threaded rod 34, having a hand wheel 35 at one end and connected at its opposite end at 36 to the upper end of a lever 37 pivoted at 38 to the machine frame or a bracket extended therefrom, said lever being jointed at 39, Fig. 2, to an actuating rod 40, the rear end of which is adjustably mounted in the slot 41 of a link member 42, pivoted at 43 and having a part engaging the cam groove 44 of the actuating cam 45, substantially as pointed out in my prior application, with the exception that in said application no provision was made for changing the path of lateral or transverse vibration of the cam plate, whereas in the present invention means are provided to this end, such means being embodied as one form of the invention in the adjusting rod 34 having screw-thread connection with the arm 30, whereby, without altering the amplitude of transverse or lateral vibration of the cam plate, its path of vibration may be changed. In the present embodiment of the invention the adjusting rod 34 has also a screw-thread connection 46, Fig. 2, to a threaded sleeve 47 which affords connection with the lever 37, said screw thread 46 preferably being of a different pitch from that of the screw-thread connection between the rod 34 and the sleeve 32. However, so far as the broad scope of the invention is concerned, these details may be variously changed, the improved feature in this respect being the capacity for changing the path of lateral vibration of the cam plate 26 while still maintaining its original amplitude of vibration.

In order to change the amplitude of vibration given to the cam plate 26, the cam faced gear 22 is provided with a cam 48, Fig. 2, adapted to engage a roll or pin 49 carried by a lever 50 pivoted at 51 and having an offset portion 52 through which extends an adjusting screw 53 having a hand adjusting wheel 54, said adjusting screw being connected to a pin or block 55 movable in a slot 56 of said lever and jointed to the upper portion of a lever 57, the lower end of which is connected at 58 to a lifting lever 59 pivoted at 60 and having its other end connected at 61 to a link 62 which is itself jointed to a link 63 connected to the end of the rod 40, the construction being such that upon rotation of the cam faced gear 22 the cam 48 will move the lever 50 and, through the connecting devices, move the end of the rod 40 in the slot 41 of the link member 42, thereby varying the extent of movement given to said rod 40 and consequently, through the connecting mechanism hereinbefore described, changing the amplitude of lateral or transverse movement of the cam plate 26.

It is desirable on different portions of the shoe sole to effect different treatments in a sole laying and leveling machine, as pointed out in my prior application, and the cam 48 carried by the cam faced gear 22 is so formed that the proper or desired treatment on any part of the shoe sole may be had through the instrumentalities hereinbefore described, it being evident that the shape of the cam may be appropriately varied to suit varying purposes in this regard. As another means for varying the character of the transverse movement given to the cam plate 26, the adjusting screw 53 may be manipulated by the hand wheel 54 to move the end of the lever 57 nearer to the or farther from the fulcrum 51 of the lever 50, all as will be readily understood.

Having reference to Fig. 1 of the drawings, there is shown herein a sole laying or leveling device constituted as a mold having substantially the same general contour as the sole of the shoe to be treated. This mold 64 may be substantially the same as that shown and described in my prior application referred to and may be suitably actuated to bring corresponding portions of the mold 64 and shoe sole into coacting relation by means of the gears 65 and 66, the latter being secured to an upright shaft 67 having a gear 68 for operative engagement with suitable teeth 69, Fig. 3, on the jack carriage or carrier, to be hereinafter described. The form 64 may also be given a longitudinal vibratory movement through the gear connection shown between the shaft 70, Fig. 1, and the vibrating means for said form, which may be substantially the same as that shown and described in my prior application, and, since such form and its actuating means are not to be herein claimed, further elucidation thereof will be unnecessary.

Mounted in suitable guideways 71 and 72 of the table 7 and so as to move longitudinally of said table is the jack carrier or carriage 73, Figs. 1, 2 and 3, the connection between the said jack carrier and table being substantially the same as that set forth in my prior application.

In order that the jack carrier 73 may be properly moved longitudinally of the table 7 in the guideways thereon, that is, toward the front and rear of the machine, the rear portion of said jack carrier is connected to a pitman 74 pivoted to the jack carrier at 75, and at 76 connected to the upper end of an actuator 77 which is mounted at its lower end on a shaft 78 and has connected to its hub an operating arm 79, Fig. 2, said arm being shown in dotted lines. The upper end of the arm 79 is provided with a roller or pin 80 adapted to engage a suitable cam path 81 formed in the cam faced gear 22, an enlarged view of said cam faced gear and cam path 81 being indicated in Fig. 16, to which reference will hereinafter be made. The pitman 74 connecting the jack carrier with its actuator 77 is preferably provided with means for adjusting the length thereof, as, for instance, with a hand wheel 82, Fig. 2, with the right and left hand screw-thread connection 83, 83, to the parts of the pitman, as will be readily understood, the construction being such that upon manipulation of the hand wheel 82 the length of the pitman 74 may be lengthened or shortened.

The jack carrier 73, Figs. 1, 2 and 3, has rising from its base portion the supporting arms 84, one at either end, which constitute the sustaining means for a cradle 85 carrying the shoe support element, the connection between the jack carrier 73 and cradle 85 being such as to provide for shifting the supports of the cradle laterally relative to the direction of the application of pressure by the former, such lateral shifting of the line of support being accomplished without substantially tilting or swinging the table and being susceptible of control, so that equal pressures may be applied to the sole at each side of its center at any point in its length, or such pressure may be caused to act more effectively on one side than on the other side. As one means of carrying this feature of the invention into effect, the cradle 85 is provided at either end with a supporting top portion or head 86, 86 which rests upon a slide 87, Fig. 3, which is mounted to move transversely of the jack carrier and which may be pivotally connected to another slide 88 as at 89, said slide 88 being also mounted on the jack carrier 73 to move transversely. The slide 88 is preferably supported on a track 90, and to secure ease of movement transversely anti-friction devices may be interposed between the two, as likewise may such anti-friction devices be interposed between the head 86 and the slide 87, substantially as set forth in my application hereinbefore referred to and as also fully described in my prior application Ser. No. 415,835, filed February 14, 1908.

In order that the cradle 85 may be held from pivotal movement transversely of the jack carrier when its supports are moved transversely, a plate 91. Fig. 3, is secured to the jack carrier and provided with a suitable projection 92 to engage a corresponding recess formed in the head portion of the cradle, all substantially as pointed out in my prior application 415,835, to which reference has been made.

From the above description and from the more detailed description in my said prior application, it will be clear that any pressure applied to a shoe sole supported on the jack or shoe support will be transmitted through the heads 86 of the cradle (one of said heads of course being at either end of the cradle) to the jack carrier 73 through the pins or trunnions 89 and at the line connecting these pins or trunnions which constitutes the line of support for the jack. This line of support is preferably, though not necessarily, in the general horizontal plane of the last bottom, so that the support for the last is substantially in the plane thereof. The shifting of this line of support laterally or transversely with reference to the jack and the shoe mounted thereon is herein accomplished by shifting the slides 88 relative to both the jack carrier 73 and the cradle 85, thus carrying the terminals of the line of support of the pins to one or the other side of the central line of the shoe or the line along which the pressure is applied. The means for effecting this shifting movement of the line of support may be substantially the same as that set forth in my said application 454,082, and comprises a lever 93 pivotally mounted at each end of the jack carrier 73 at 94, the upper end of which works in a recess formed in the slide 88. If, now, the lower ends of these levers be moved transversely, it will be apparent that the line of support will be shifted laterally or transversely with respect to the jack and the shoe mounted thereon. In order to effect this shifting action of the line of support, the lower ends of the levers 93 are appropriately under the control of the cam path 28 in the cam plate 26, it being understod that any suitable means for connecting the lower ends of these levers operatively with the cam path 28 may be employed. In the present illustration of the invention the means is substantially the same as that shown and described in my prior application 454,082 and comprises a roller 95, Fig. 3, mounted on a suitable pin 96 carried by a slide 97 movable transversely of the jack carrier and sustained by a slotted web 98, the slide 97 having a recess appropriately engaged by the lower end 99 of the lever 93, it being understood that substantially the same connecting means between both of the levers 93 and the cam path 28 may be employed. The rolls 95, moving in the cam path 28 of the cam plate 26 as the jack carrier is moved back and forth in response to its actuating means, will have imparted thereto lateral movement in response to the formation of the cam path 28, as will be readily understood. Likewise, any transverse or lateral vibration given to the cam plate 26 will be likewise imparted through the rolls 95 to the levers 93. Thus the line of support will be shifted in accordance with the characteristic of the cam path 28 and also in accordance with any lateral movement of the cam plate 26.

Mounted in suitable ways 100 in the cradle 85, see Fig. 7, is the shoe supporting saddle or jack proper 101, Figs. 5 and 7. Rising from the rear portion of this shoe supporting saddle or jack proper 101 is the post 102, Figs. 3, 5 and 9, and pivotally mounted at 103 in the post 102 is the last pin support 104, having the last pin 105, the lower end of said last pin support, Fig. 5, being connected at 106 to an upwardly projecting arm 107, Figs 5 and 6, rising from an actuating link 108, said actuating link 108 being preferably formed as a yielding member and, in the present embodiment of the invention, comprising two parts, Fig. 6, connected by an adjusting bolt 109 having nuts 110 on one end thereof and bearing against the outer portion of one end member, and the other end being screw-threaded at 111 into the other member, a spring 112 being interposed between the two members, substantially as indicated in Fig. 6, whereby, upon movement of the actuating link 108 rearwardly by pressure upon the front member, the last pin support will be turned with a yielding movement to jack the shoe, as will be readily understood.

As indicated in Fig. 9, the last pin support 104 is loosely pivoted to the post 102 that it may have lateral or transverse movement with respect to said post, as indicated in Fig. 9, the effect being that the last pin 105 and its support may readily accommodate themselves to the varying positions of the last pin receiving recess 113 in the lasts.

As well known by those skilled in the art, shoe lasts are formed with the last pin receiving recess 113 and an attempt is made to have uniformity in their location, but, as a matter of fact, they vary very much in different lasts and even in lasts of the same size, and especially is this variation in location marked in the transverse position of the last pin receiving recess. The importance of the loose pivotal connection of the last pin support will be readily appreciated from the above fact taken in connection with the fact that the heel or rear portion of the last must seat itself against the heel gage and also be uniformly embraced by the counter clamps, all of which will hereinafter more fully appear.

Pivotally mounted on the shoe supporting saddle or jack proper at 114, Figs. 5 and 7, is the jacking lever 115 having loosely mounted thereon a crank arm 116, said crank arm being operatively joined to the jacking lever by means of a spring 117, Fig. 7, one end of which is secured to the jacking lever at 118 and the other end of which is connected at 119 to the crank arm 116, the hub of said crank arm being provided with a stop 120 and the shaft 114 being provided with a pin 121 to limit relative movement of the crank arm 116 in response to the spring 117.

Extending transversely near the bottom of the post 102 is a shaft 122 having an eccentric portion 123 carrying a jack lock 124 provided with teeth 125 which are adapted to engage complemental teeth 126 fixed to the bottom portion of the cradle 85, as clearly indicated in Figs. 5 and 7. The shaft 122 has a crank arm 127 which is connected to the crank arm 116 by means of link 128, the construction being such that upon movement of the jacking lever contra-clockwise, Fig. 5, the crank arm 116, through the spring 117, will move in a like direction and turn the shaft 122, so that if the teeth 125 and 126 on the jack lock and cradle respectively are engaged, the eccentricity of the jack lock mounting, with respect to the shaft 122, will give a backward sliding movement to the shoe supporting saddle after the shoe has been seated against the heel gage, as will hereinafter more fully appear, and will maintain the parts in this locked position. The jack lock 124 is provided with a finger 129 which rests upon a pin 130 connected to the shaft 114, so that as the jacking lever 115 is turned contra-clockwise the pin 130 will permit the jack lock to fall so that the teeth 125 and 126 may be brought into operative engagement. The actuating link 108, at the end thereof adjacent the jacking lever, is provided with an upwardly projecting lug portion 131, Fig. 5, said portion having a slot 132 adapted to receive a crank pin 133 connected to the jacking shaft 114, said slot 132 being formed so that upon movement of the jacking lever contra-clockwise the pin 133 will move in said slot and force the actuating link 108 rearward, thereby turning the last pin support 104 with a yielding motion upon its fulcrum 103, and jack the shoe, in a manner well understood.

Pivotally supported at 134, Fig. 3, on the cradle 85 is a heel gage lever 135 having an upwardly extending portion 136 against which bears the end of an adjusting screw 137 carried by a lever 138, said adjusting screw and arm 136 being held in engagement by a suitable spring, as 139. Supported on the upper portion of the lever 138 is the heel or back gage 140, Figs. 3, 10, 12 and 13, preferably faced with a yielding or other suitable material 141 to contact with the rear portion of a shoe, when the latter is placed in operative position.

The toe rest 142, Figs. 3 and 5, is preferably mounted for adjustment upon a carrier 143 secured to a toe rest support 144 which may be substantially as set forth in my application 429,202, filed April 25, 1908. The toe rest support is pivoted at 145 to the shoe supporting saddle 101 and provided at its upper portion with slots 146 into which extend the pins 147 carrying the toe rest, said pins being sustained upon spring supported plungers 148, substantially as set forth in my application 429,202, means such as the rack teeth 149 and 150, Fig. 14, being provided, as more fully set forth in the application just referred to, for locking the toe rest in position of adjustment as the shoe moves the toe rest into conformity with itself and as the shoe is jacked, all as set forth in my prior application. In the present case a spring 151 connected to the depending arm 152 and to a fixed part 153 tends to normally hold the toe rest in position for the most favorable engagement with the toe of the shoe, an adjusting screw 154 serving to limit the movement of the toe rest in response to the spring 151.

In order to effect size adjustment, that is, to adjust the toe rest and heel gage relatively to accommodate the particular size of shoe to be treated, the toe rest support 144, Fig. 8, is provided with an arm 155 having a pin 156 in engagement with a block 157 movable in a slideway 158 formed in a bearing 159 carried by a pin 160, the construction being such that upon vertical movement of the pin 160 the toe rest will be swung on its pivotal support 145 to carry it toward or from the heel gage, as will be readily understood. To effect such movement of the toe rest and simultaneously therewith corresponding or opposite movement to the heel gage, a size adjustment device is employed, comprising a hand lever 161 pivoted at 162 and connected to the heel gage lever 135 by a link 163; said hand lever being likewise connected to the pin 160, as indicated in Fig. 8, and as fully set forth in my prior application 429,202, so that upon movement of the lever 161 the heel and toe gages will be appropriately moved. Inasmuch as the size adjusting means, comprising the trip catch 164, Fig. 8, its hand operating device 165 and associated parts, are similar to those of my prior application 429,202, it will be unnecessary to herein further describe the same.

Pivotally supported on the toe rest support 144 and preferably on the pivotal axis 147 of the toe rest is an instep support, Figs. 2, 3, 5 and 14. In the present form of the invention, with respect to this feature, the instep support comprises suitable side plates 166, Figs. 5 and 14, carried by the cross pin 147 and suitably joined together to form a rigid structure by the web 167, Fig. 14. The lower portion of one of the instep supporting plates is formed as a segment 168, Fig. 14, and provided with a series of holding teeth 169, said teeth being adapted to engage a spring-pressed pawl 170 disposed below the same, said spring-pressed pawl being preferably formed as a series of such devices in order to get finer adjustment, as will be readily understood. Obviously, various means might be employed to hold the instep support in its adjusted position, other than the toothed segment 168 and the spring holding pawls 170, but the present devices are found in practice to be well suited to the purpose, although not essential to this feature of the invention. The instep support is provided with bearings 171, 171, suitable for supporting a shifting pin 172 to which is connected an instep supporting saddle 173, Fig. 15, said saddle being preferably provided with a set screw 174 by which to connect it to the shifting pin 172, Fig. 15. The sleeve 175 to which the instep supporting saddle is secured or by which it is carried has a depending lug 176, Fig. 15, and a spring 177 has one end connected to said lug and the other end to a fixed part of the instep support, as at 178, Fig. 14, the construction being such that the spring 177 normally tends to maintain the instep supporting saddle to one side of the instep support, as indicated in Fig. 15. The instep supporting saddles 173 are preferably formed in pairs, one for rights and one for lefts, in order to accommodate the different swings of shoes, as will be readily understood. For instance, the instep supporting saddle shown by Fig. 15 would be adapted for one swing or form of shoe, and a saddle having the reverse formation, that is with the right side more extended and elevated than the left, would be adapted for shoes having an opposite swing, as will be readily understood by those skilled in the art. As will also be obvious, when one form of saddle is substituted for another, the spring 177 may be suitably changed to position the instep supporting saddle on the proper side of the instep support suitable to the swing of the shoe to be supported. With respect to the instep supporting means, also, various changes may be made in the details and formation of parts within the true scope of the invention, the general characteristics of such support being indicated in Fig. 14, wherein the dash and dot line represents approximately the outline of a shoe instep and the relation thereof to the instep supporting saddle when in the act of engagement therewith. It will also be noted that the instep supporting saddle may accommodate itself rotatively in the bearings 171 so as to readily conform to the contour of the shoe instep. The axial support 147 of the instep supporting saddle has secured thereto a handle 179, Figs. 3 and 5, whereby it may be swung up into shoe engaging position and there held by the toothed rack 168 and its coöperating pawls 170.

It will be noted that the instep support is movable toward and from the heel or back gage 140 with the toe rest, and it will be also noted that the holding pawls 170 are spring actuated so that after the shoe has been jacked and its toe firmly seated in the toe rest, at which time the rack teeth 169 are engaged with the spring pawls 170, the instep support may be adjusted by the handle 179 so as to force it firmly up into contact with the instep of the shoe, the pawls 170, at such times, yielding to the passage of the teeth 169, Fig. 14.

In order that the lasted shoe may be securely held in operative position during the action of the laying or leveling means on the sole thereof, it is desirable that the counter of a shoe be engaged and held by suitable counter clamps. As the shoe is jacked and moved back against the heel rest 140, it is desirable that the counter clamps be separated so that the rear of the shoe can readily move to place, and that thereafter and prior to the action of the leveling means upon the sole, the counter clamps be firmly placed against the counter of the shoe. Having these matters in mind, the present invention contemplates automatically acting counter clamps to secure the above objects and as one embodiment of means to this end the following is of good practical form.

The heel gage supporting lever, preferably at its upper portion, see Figs. 3, 10, 12 and 13, is provided with a suitable guideway 180 in which move the slides 181 and 182 carrying counter clamps 183 and 184 respectively, Figs. 3 and 10.

Mounted to turn in suitable bearings carried by a bracket 185, Figs. 3 and 10, is a shaft 186 having a right and left screw thread 187, Fig. 12, said right and left screw threads engaging correspondingly threaded portions 188 and 189 of the slides 181 and 182 respectively, as clearly indicated in Fig. 12, the construction being such that upon rotative movement of the shaft 186 the slides 181 and 182 and perforce their counter clamps are moved toward and from each other.

In the particular embodiment of the invention herein illustrated, the shaft 186 is surrounded by a sleeve 190, Fig. 12, which is supported in the bearings 191 carried by the bracket 185, said sleeve being provided with a suitable collar 192 and connected to rotate with said shaft 186. The outer end of the shaft 186 is screw-threaded and is engaged by a clamping nut and collar 193, the latter bearing against the exterior end of the sleeve 190. Splined to the sleeve 190 is a hand wheel 194 having connected thereto a gear 195 whereby, by rotative movement of the hand wheel or gear, the sleeve 190 and perforce the shaft 186 will be correspondingly rotated.

Pivotally mounted upon the cradle 85 as at 196, Fig. 11, is an arm 197 carrying a segment gear 198, the teeth of which, when the parts are in position indicated in Fig. 10, are in operative engagement with the teeth of the gear 195, and extending from the pivotal support 196 of said arm 197 is a finger 199, to the lower end of which is connected one end of a spring 200, the opposite end being connected at 201 to a fixed point on the cradle 85, the normal tendency of said spring being to move the finger 199 to the left, Fig. 11, until it contacts with the stop pin 202, as will be clearly apparent from Fig. 11.

From the construction described it will be obvious that upon movement of the rack segment 198 the shaft 186 will be turned and the counter clamps moved toward and from each other according to the direction of movement of the segment, movement of the segment clockwise under the action of the spring 200 acting to close the counter clamps, and opposite movement of the segment serving to open them.

Pivotally mounted upon the table 7, Fig. 11, as at 203, is a segment actuator 204 comprising an arm extending rearward of the table 7. Secured to the jack carrier 73 is a cam piece 205 disposed so as to engage the curved portion 206 of the segment actuator as the said jack carrier moves outward to its full position for removal of the shoe from the jack, said cam piece 205 serving at such time to raise the segment actuator 204 so that its inner end 207 is placed in position to engage the lower end of the finger 199 and cause the rack segment 198 to be rotated contra-clockwise, thereby opening the counter clamps. On inward movement of the jack carrier to operative position, the end 207 of the segment actuator is allowed to drop from the cam piece 205, thereby permitting the spring 200 to turn the rack segment 198 and close the counter clamps. The relative disposition of the cam piece 205 and segment actuator is such that the segment actuator 204 will not be raised into position to engage the end of the finger 199 when the jack carrier is moved toward and from the front of the machine during the laying or leveling operation, but is so moved when the jack carrier is given its full forward movement to present the jack for removal of a shoe or the placing of a shoe thereon.

It is sometimes desirable that the counter clamps be moved or adjusted by hand, and to enable this to be done conveniently the present invention contemplates means for turning the shaft 186 at desired times without moving the segment 198, such means in the present form of the invention comprising a sliding connection between the hand wheel 194 and gear 195 and the sleeve 190, such connection being preferably formed by a spline 208, the construction being such that the hand wheel 194 and gear 195 may be moved toward the end of the shaft 186 to disengage the gear 195 from the segment rack 198, and, as the hand wheel and gear still remain in splined connection with the shaft 186, said shaft may be turned in either direction, as desired, independent of movement of the rack segment 198. As a means for maintaining the hand wheel 194 and gear 195 in position, as indicated in Fig. 12, with the gear 195 in engagement with the segment rack 198, a spring-pressed plunger 209 is provided, Fig. 12, said plunger having a rounded inner end, as indicated, adapted to engage a suitable recess in the sleeve 190 when the gear 195 is in position of engagement with the rack segment, the construction being such that, upon a forceful pull of the hand wheel 194 and gear 195 toward the end of the shaft 186, the plunger 209 will yield and permit movement of the parts toward the end of the shaft, as will be apparent. When the proper adjustment has been made, the parts may be returned to initial position and there held by the plunger 209 with the gear 195 in engagement with the rack segment 198.

From the construction described it will be apparent that, when the jack proper or shoe supporting saddle is pulled to the front, the jack carrier at such times being in position as indicated in Fig. 2, and the jacking lever 115 in position as indicated in Fig. 5, a lasted shoe may be readily applied to the last pin 105 and the toe of the shoe be supported on the toe rest, the counter clamps at such time having been separated by the segment actuator 204 in the manner hereinbefore described. With the shoe and parts in position as indicated in Fig. 5, the heel gage and toe rest having been properly manipulated for size adjustment, if the shoe supporting saddle be moved backward to bring the rear of the lasted shoe in contact with the heel gage and the jacking lever 115 thrown to the left, the jack lock will have its teeth 125 engaged with the teeth 126 on the cradle and as the jacking lever is given its full throw to the left, the eccentricity of the jack lock 124 with respect to the shaft 122 will give a final backward pressure to the shoe supporting saddle to bring the rear of the shoe in firm contact with the back gage. With the parts in this position, the instep support may be manipulated by the handle 179 to throw the instep supporting saddle into firm contact with the instep of the shoe. Upon starting the machine into operation in the manner set forth in my previous application 454,082, the jack carrier will be moved backward, thus disengaging the finger 199 from the segment actuator 204 and permitting the spring 200 to actuate the counter clamps and force them in firm contact with the shoe.

As hereinbefore indicated, the last pin socket in the last may be out of line with the central portion of the last and if means were not provided, the uniform complemental motion given the respective counter clamps would cause the counter clamps to bear unequally upon opposite sides of the shoe, but, owing to the loose lateral play afforded the last pin support 104, the lasted shoe is permitted to center itself with respect to the counter clamps and thus be held in firm and fixed position, regardless of the position laterally of the last pin socket in the last.

When the jack carrier has been moved to the rear to bring the sole of the shoe into position with a part of the shoe sole beneath the laying or leveling form, the table 7 is appropriately raised through the means hereinbefore described, causing the form and shoe sole to be brought into contact at the shank of the latter, the cam plate 26, at such times, being transversely vibrated to vary the relative position of the line of support with respect to the jack or shoe sole. Owing to the character of the cam path 81 in the cam faced gear 22, the jack carrier moves continuously backward until the laying or leveling form meets the toe of the shoe, the cam path 28 in the cam plate 26 being such as to provide the necessary variations in pressure on different portions of the shoe sole transversely during such movement by transversely shifting the line of support with respect to the cradle 85 and shoe carried thereby. At the limit of movement to bring the toe and form into laying or leveling contact, the transverse vibration of the cam plate 26 gradually ceases, owing to the formation of the cam 48 in the cam-faced gear 22. Under demand of the cam path 81 the jack carrier is then moved back and forth a short distance to treat the toe of the shoe, there being little or no transverse vibratory shifting of the line of support with respect to the shoe at this time. The cam 81 then moves the jack forwardly so that the form travels over the sole from the toe to the rear of the shank, and as it passes or just as it has passed from the ball of the shoe, the plate 26, under direction of the cam 48, again commences to vibrate transversely as before, and the jack carrier is then moved to travel the form toward the ball line of the sole, finally returning so that the form rests on the shank of the shoe as at the beginning of the operation, such movement of the jack carrier being caused by the cam path 81, and the cam plate 26 still continuing its transverse vibration. This operation is then repeated in treating a welt shoe, and when the jack carrier has been moved to its initial position at the commencement of the operation, it drops under the direction of the cam 24 and lever 9, and then moves to the front to a position of presentation.

In some work, as in sole laying, it is desirable that the above operations be not repeated, the form, in such cases, moving only once over the sole either with or without vibrative movement of the cam plate 26; and in turn work the same operation as first set forth may be carried out, except that the repeat at the toe is or may be avoided, if desired, such modifications in the operation of the machine being due to the particular form of cams employed.

What is claimed is:

1. In a machine for treating boots and shoes, the combination of last supporting means, means to sustain the last supporting means along a line of support, means for automatically moving the last supporting means in a direction longitudinally of the shoe, and means for relatively shifting the line of support and the last supporting means transversely during such longitudinal movement.

2. In a machine for treating boots and shoes, the combination of last supporting means, means to sustain the last supporting means along a line of support, means for automatically moving the last supporting means in a direction longitudinally of the shoe, means for relatively shifting the line of support and the last supporting means transversely during such longitudinal movement, and means for relatively vibrating said line of support and last supporting means as they are relatively shifted transversely.

3. In a boot and shoe treating machine, the combination of last supporting means, means to sustain the last supporting means along a line of support, means for relatively vibrating the line of support and last supporting means transversely, and means for varying the path of transverse vibration.

4. In a boot and shoe machine, the combination of a jack, means for sustaining the jack along a line of support, means to shift the line of support laterally of said jack, and means to additionally move the line of support laterally.

5. In a boot and shoe machine, the combination of a table, a jack, means for moving the jack longitudinally of the table, means for sustaining the jack along a line of support, and a cam plate connected to said table for moving the line of support laterally of the jack as it is moved on said table.

6. In a boot and shoe machine, the combination of a table, a jack, means for moving the jack longitudinally of the table, means for sustaining the jack along a line of support, a cam plate connected to said table for moving the line of support laterally of the jack as it is moved on said table, and means for moving the cam plate laterally of the table.

7. In a boot and shoe machine, the combination of a jack, means for sustaining the jack along a line of support, a cam for shifting the line of support laterally, means for additionally moving said line of support laterally to and fro, and means for adjusting such additional lateral to and fro movement.

8. In a boot and shoe machine, the combination of a jack, means for sustaining the jack along a line of support, means for moving the jack longitudinally, a cam for shifting the line of support laterally, means for additionally moving said line of support laterally to and fro, and means for adjusting such additional lateral to and fro movement.

9. In a boot and shoe machine, the combination of a jack, means for sustaining the jack along a line of support, and adjustable means for laterally vibrating the line of support relative to the jack.

10. In a boot and shoe machine, the combination of a jack, means for sustaining the jack along a line of support, a cam for moving the jack in a longitudinal direction, a cam for relatively shifting the line of support and jack as the jack is moved longitudinally, and adjustable means for additionally shifting the line of support and jack relatively.

11. In a boot and shoe machine, the combination of a driving shaft, a table, a jack carrier movable longitudinally of the table, a jack having sustaining means supported by said carrier, a cam plate mounted on the table, and connections between the cam plate and jack sustaining means to cause said sustaining means to move transversely as the jack and carrier are moved longitudinally of the table.

12. In a boot and shoe machine, the combination of a driving shaft, a table, a jack carrier movable longitudinally of the table, a jack having sustaining means supported by said carrier, a cam plate mounted on the table, connections between the cam plate and jack sustaining means to cause said sustaining means to move transversely as the jack and carrier are moved longitudinally of the table, and means for moving the cam plate laterally.

13. In a boot and shoe machine, the combination of a jack, means to sustain the jack along a line of support, means to move the jack longitudinally at varying speeds, and means for relatively shifting the line of support and jack transversely.

14. In a boot and shoe machine, the combination of a jack, means to sustain the jack along a line of support, means to move the jack longitudinally at varying speeds, means for relatively shifting the line of support and jack transversely, and means for relatively vibrating the line of support and jack transversely.

15. In a machine for treating boots and shoes, a table, a jack mounted thereon, means for sustaining the jack along a line of support, a driving shaft, a cam plate on said table for shifting the line of support laterally relative to the jack, and adjustable connections between the driving shaft and cam plate for operating the latter.

16. In a boot and shoe machine, the combination of a jack, means for sustaining the jack along a line of support, means for vibrating the line of support laterally of the jack, and means for altering the amplitude of vibration.

17. In a boot and shoe machine, the combination of a jack, means for sustaining the jack along a line of support, means for vibrating the line of support laterally of the jack, means for altering the amplitude of vibration, and means for changing the path of such vibration.

18. In a boot and shoe machine, a shoe support comprising a heel rest and toe rest, an instep support movable with the toe rest toward and from the heel rest and means for independently moving the instep support into instep supporting position.

19. A shoe support comprising a heel rest and a toe rest, an instep support, and means for locking it in instep supporting position.

20. A shoe support comprising a heel rest and a toe rest, means for jacking the shoe on said shoe support, an instep support, and means for moving it into instep supporting position after the shoe is jacked.

21. A shoe support comprising a heel rest and a toe rest, means for jacking the shoe on said support, and an instep support having a laterally movable supporting saddle.

22. A shoe support comprising a heel rest and a toe rest, means for jacking the shoe on said support, and a swinging and laterally movable instep support.

23. A shoe support comprising a heel rest and a toe rest, means for jacking the shoe on said support, an instep support having a laterally movable supporting saddle, and means for sliding the saddle laterally.

24. A shoe support comprising a heel rest and a toe rest, means for jacking the shoe on said support, an instep support having a laterally movable supporting saddle, and a spring acting to maintain the saddle to one side of the support.

25. A shoe support comprising a toe rest and an instep support, means for sustaining the toe rest and instep support yieldingly to allow the toe rest to automatically adjust itself to the shoe, means for locking the toe rest in position by downward movement thereof, and means for adjusting the instep support in place after the toe rest has been locked.

26. In a shoe support, the combination of a heel gage, a toe rest and an instep support, and size adjusting means for moving said parts to adapt them to the size of the shoe to be sustained by said support.

27. In a shoe support, the combination of a heel gage, a toe rest, an instep support, means to simultaneously adjust said parts to the size of the shoe to be sustained by said shoe support, and means for individually and additionally adjusting the instep support.

28. In a shoe support, the combination of a heel gage, a toe rest and instep support, means to simultaneously adjust said parts to the size of the shoe to be sustained by said shoe support, means for individually and additionally adjusting the instep support, and means for locking the instep support in individual adjusted position.

29. In a shoe support, a heel gage, a shoe supporting saddle having a last pin and toe rest and movable toward and from the heel gage, means for jacking the shoe on said shoe support, and a jack-lock for locking the shoe supporting saddle in rear position with respect to the heel gage and for giving the saddle an increment of back movement to force the shoe into contact with the heel gage.

30. In a shoe support, a shoe supporting saddle, means for jacking a shoe thereon, a rear or heel gage against which the shoe is moved prior to jacking the shoe, a jack-lock for holding the saddle with the shoe in contact with the rear or heel gage, and means operative through the jack-lock as the shoe is jacked to force the shoe supporting saddle rearwardly.

31. In a shoe support, a shoe supporting saddle, a heel gage toward which the shoe supporting saddle is movable to position the shoe, means for jacking a shoe on said saddle, and means for locking the saddle in rear position and imparting thereto an increment of rearward movement to force the shoe against the heel gage as the shoe is jacked.

32. In a shoe support, means for sustaining a shoe in jacked position, counter clamps for engaging the rear of the shoe, means for moving the shoe sustaining means in a longitudinal direction, and means operative through such longitudinal movement to actuate and cause the counter clamps to engage the shoe.

33. In a shoe support, means for sustaining a shoe in jacked position, counter clamps for engaging the rear of the shoe, means for relatively moving the shoe sustaining means and counter clamps in a longitudinal direction, and means operative through such longitudinal movement to cause the counter clamps to engage the shoe.

34. In a shoe support, means for sustaining a shoe in jacked position, counter-clamps for engaging the rear of the shoe, means for moving the shoe sustaining means longitudinally, and means actuated by movement of the shoe sustaining means in one direction to cause the counter clamps to engage the shoe and, by movement in the opposite direction, to unclamp the shoe.

35. In a shoe support, means for sustaining a shoe in jacked position, counter clamps for engaging the rear of the shoe, means for moving the shoe sustaining means longitudinally, and a toothed rack movable with the shoe sustaining means and operable to close the counter clamps upon movement of the shoe sustaining means in one direction and to open them during movement in the opposite.

36. In a shoe support, means for sustaining a shoe in jacked position, counter clamps for engaging the rear of the shoe, means for moving the shoe sustaining means longitudinally, right and left screw operating means for said counter clamps, and means actuated during movement of the shoe sustaining means in one direction to operate the right and left screw to close the counter clamps.

37. In a shoe support, means for sustaining a shoe in jacked position, counter clamps for engaging the rear of the shoe, means for moving the shoe sustaining means longitudinally, yieldingly acting means for closing the counter clamps during movement of the shoe sustaining means in one direction, and positively acting means to open the clamps during movement in the opposite direction.

38. In a shoe support, the combination of counter clamps, and a shoe supporting saddle movable toward the counter clamps to position a shoe therebetween, said movable saddle having a loosely mounted last pin to enable the shoe to move laterally into proper position with the counter clamps as the saddle is moved to position the shoe.

39. In a shoe support, the combination of counter clamps, means to close them upon a shoe placed between said clamps, and a slidable shoe supporting saddle movable toward and from the counter clamps, said saddle having a last pin mounted to move laterally to accommodate itself to improperly formed last pin sockets in lasts and to be free to move laterally as the counter clamps clamp the shoe between them.

40. In a shoe support, means including a laterally movable last pin for sustaining a shoe in jacked position, counter clamps for engaging the rear of the shoe, said means being movable longitudinally to position a shoe between the counter clamps, and means operative during such longitudinal movement to close the counter clamps upon the shoe.

In testimony whereof, I have signed my name to this specification, in the presence of two subscribing witnesses.

THOMAS G. PLANT.

Witnesses:
WILHELMINA SCHUERCH,
ALFRED H. HANDLEY.